Patented Sept. 20, 1949

2,482,532

UNITED STATES PATENT OFFICE 2,482,532

MEROCYANINES AND PROCESS FOR THEIR PREPARATION

Alfred W. Anish, Vestal, N. Y., assignor to General Aniline & Film Corporation, New York, N. Y., a corporation of Delaware No Drawing. Application December 7, 1945, Serial No. 633,537

7 Claims. (Cl. 260—240)

The present invention relates to new merocyanine dyes and to methods for their production.

Merocyanine dyes and their use as photographic sensitizers are already well-known. In general, the merocyanines are the condensation products of sensitizing dye intermediates possessing an active methylene group, such as is present in thiazolidones, oxazolidones, pyrimidones, pyrazolines, rhodanines, etc., all of which are characterized by having a keto-methylene nuclear structure. However, in the heretofore known merocyanine dyes the keto-methylene structure is a part of a monocyclic molecule.

According to my invention, I have found that dyes having strong sensitizing properties can be prepared from polycyclic molecules in which one of the fused heterocyclic nuclei has a diketopyrimidine structure. The polycyclic compounds from which the new merocyanines are prepared may be represented by the following formula in which Z has the significance hereinafter indicated.

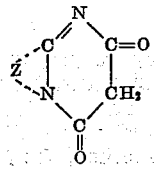

The dyes comprising my invention may be represented by the following formulae:

II

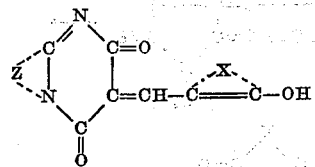

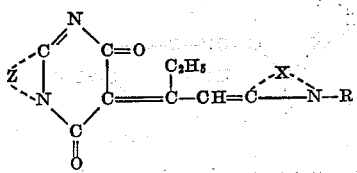

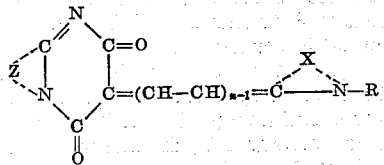

wherein X and Z represent the atoms necessary to complete a nitrogenous heterocyclic nucleus usual in the cyanine dye art, $n$ represents a positive integer ranging from 1 to 3, and R represents an alkyl group.

More particularly, X, for example, represents the non-metallic atoms necessary to complete a heterocyclic nucleus containing, for instance, a member of the oxazole series, e. g. benzoxazole; or a member of the thiazole series, e. g. benzothiazole; or a member of the thiazoline series, e. g. thiazoline; or a member of the pyridine series, e. g. pyridine; or of the quinoline series, e. g. benzoquinoline; or of the selenazole series, e. g. benzselenazole; or of the selenazoline series, e. g. selenazoline, or of the indolenine series, e. g. 3,3-dimethyl indolenine.

More particularly, Z represents, for instance, the non-metallic atoms necessary to complete a heterocyclic nucleus such as of the thiazoline or selenazoline series, e. g. thiazoline or selenazoline; or of the benzthiazole series, hexahydrobenzthiazole; or of the pyrazolone series, e. g. 3-phenylpyrazolone; or of the pyridine or quinoline series, e. g. pyridine or quinoline or of the thiazine series, e. g. thiazine. More particularly, R may represent methyl, ethyl, butyl, isopropyl, allyl, benzyl, n-amyl, and β-ethoxyethyl, etc.

The polycyclic compounds of the type illustrated by Formula I above, from which the merocyanine dyes of this invention are produced, may be prepared from a large variety of starting materials. Any heterocyclic compound substituted by a primary amine group which readily undergoes the following tautomeric imino form, will yield the corresponding bycyclic compound,

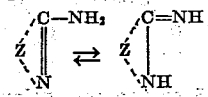

Z has the same significance as above.

In practice, the starting compounds illustrated by Formula I can be obtained by condensing the aforementioned amino substituted heterocyclic compounds with ethyl malonate according to the procedure of Masters & Bogert, Journal of American Chemical Society, vol. 64 (1942), page 2709 or by the method described in berichte vol. 57 (1924), page 1170.

More particularly, the process involved in preparing the intermediates of structure I comprises condensing amino substituted heterocyclic compounds with ethyl malonate in the presence of alcoholic sodium ethylate. As examples of amino substituted heterocyclic compounds which may be so converted into polycyclic compounds having the structure I, there may be mentioned 2- amino thiazoline, 2-amino selenazoline, 2-amino dihydrothiazine, 2-amino-5-methylthiazoline, 2-amino-4-phenylthiazoline, 2-amino hexahydrobenzthiazole, 3-phenyl-5-amino pyrazolone and 2-amino pyridine. When these compounds are condensed with ethyl malonate in the manner described, they result in compounds which may be represented by the following structural formulas:

From 2-amino thiazoline

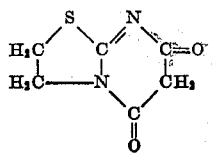

From 2-amino selenazoline

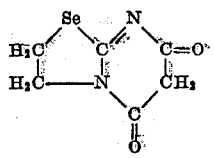

From 2-amino dihydrothiazine

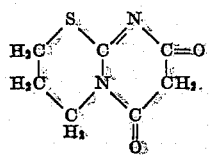

From 2-amino-5-methylthiazoline

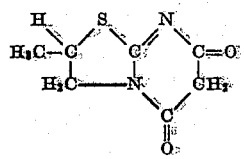

From 2-amino-4-phenylthiazoline

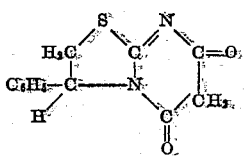

From 2-amino hexahydrobenzthiazole and

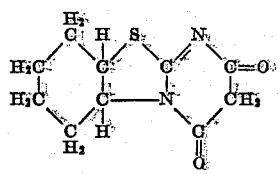

From 3-phenyl-5-amino pyrazolone

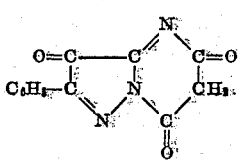

From 2-amino pyridine

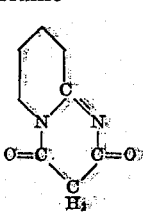

The new dyes of the above Formula II may, in general, be prepared by condensing in the presence of a suitable condensing agent a polycyclic diketo pyrimidine of structure I with a heterocyclic nitrogen compound containing a reactive group. Thus, where in the above Formulae II $n$ is 1, the heterocyclic compound may be the cyclammonium quaternary salt having in its so-called reactive positions, namely, the 2- or 4- position, an iodo atom, a cyano group, or an aryl or alkyl mercapto group. The formation of such a dye may be illustrated by the following equations:

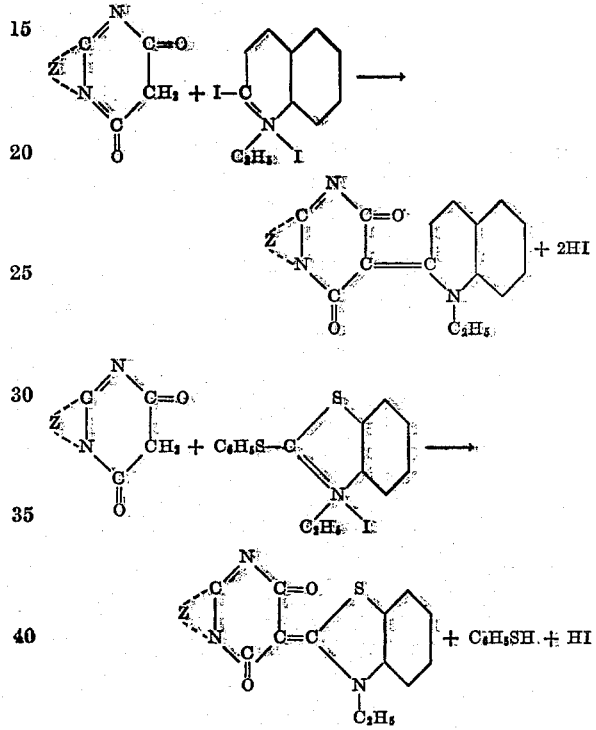

Oxonol dyes may be prepared by condensing the pyrimidine of structure I with a heterocyclic compound having an acetanilido methylene group in one of the so-called reactive positions. As illustrative of the method, the following equation is given:

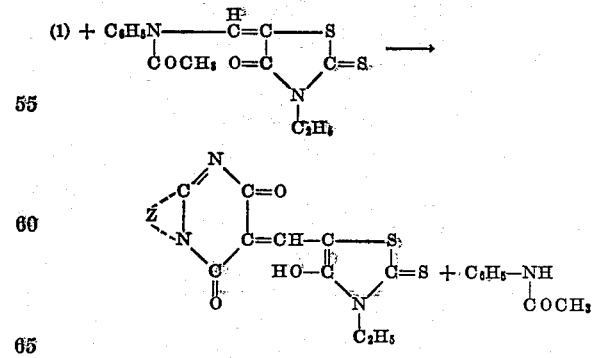

The new merocyanine dyes of the structure II in which $n$ is 3 or more, that is, the dimethine and polymethine merocyanines of this formula, may be prepared by condensing the diketopyrimidine of structure I with a β-anilinovinyl, β-acetanilidovinyl derivative of a cyclammonium quaternary salt, or omega-aldehyde, or omega-ketone derivatives, such as acetylmethylene derivatives, or β-alkyl mercapto vinyl, or β-alkyl mercapto-β-alkyl vinyl derivatives thereof, in the so-called reactive position. The procedure involving the use of omega-ketone and β-alkyl or arylmercapto-β-alkyl or aryl vinyl derivatives results in dyes having an alkyl or aryl group attached to the methine chain.

In an alternate method for the preparation of the new merocyanine dyes, the intermediate used in the dye condensation, may be the acetanilidomethylene derivative of compounds having the structure I. Such acetanilidomethylene derivatives may be characterized by the following formula:

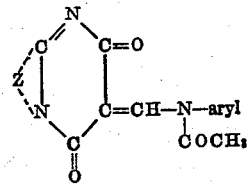

where aryl is of the benzene or naphthalene series, and Z has the hereinbefore mentioned significance.

These derivatives, which are claimed in my application Serial No. 633,538 filed on December 7, 1945, now Patent 2,423,218 July 1, 1947, may be readily formed by reacting equimolecular amounts of a compound of structure I and a diaryl formamidine, such as for example, diphenylformamidine, or arylamino acrolein anils, e. g., β-anilinoacrolein anil hydrochloride; or ω-arylamino-Δ2.4-pentadienal anils, e. g., glutaconic aldehyde dianilide hydrochloride, in the presence of acetic anhydride. For instance, if this reaction is carried out on the 2,3,6,7-tetrahydro-5,7-dioxo-5-thiazole pyrimidine, a compound having the following structural results:

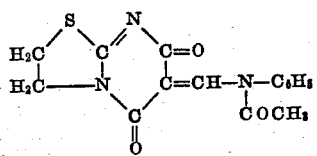

These acetanilidomethylene intermediates may be readily condensed with a cyclammonium quaternary salt having a methyl group in the reactive position in the manner indicated above to form the new merocyanine dyes.

In general, the process of preparing the dyes is advantageously carried out in the presence of suitable condensing agents. Where acids are given off during the reaction, it is preferable to use a basic condensing agent. Where water is formed during the reactions, it is preferable to use water-binding agents such as organic acid anhydrides, as for example, acetic, propionic and butyric acid anhydrides. It is preferred to use strong organic bases, examples of which are triethylamine, tributylamine, triethanolamine, N-methylpiperidine. Other basic condensing agents may be utilized as for example, pyridine, sodium or potassium acetate, sodium ethylate and sodium propionate.

The reactions to form my new dyes may also be advantageously carried out in the presence of a diluent. Lower aliphatic alcohols are preferable for this purpose. Examples of such alcohols are ethyl, n-propyl and isopropyl alcohols. Pyridine may also serve as a diluent.

Heat facilitates the formation of my new dyes. Refluxing the reaction mixture is a convenient way of forming the dyes. The intermediates which are condensed to form my new dyes are ordinarily employed in equimolecular amounts although a slight excess of one or the other may be utilized. The basic condensing agent or water-binding agent is utilized in sufficient amount to bind the acid or water eliminated from the condensing compounds. While less may be utilized, it is preferred to use the condensing agent in excess.

The following examples will serve to illustrate but are not intended to limit the invention:

*Example 1*

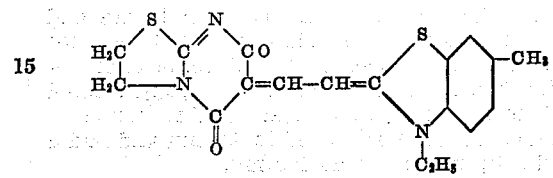

1.7 grams of 2,3-dihydro-5H-thiazolo[3,2-a]-pyrimidine-5,7(6)-dione prepared from 2-amino thiazoline and ethyl malonate in the presence of alcoholic sodium ethylate, and 3.4 grams of 2-(β-acetanilido vinyl) 6-methyl benzthiazole ethiodide were mixed in 30.0 cc. of isopropyl alcohol and 0.5 cc. of triethylamine added and the whole refluxed for 1 hour. The dye precipitates during the course of refluxing. The dye was filtered off after the reaction solution was brought to room temperature, washed with water, and the dye recrystallized from alcohol. The dye sensitized to 570 mu with a maximum at 530 mu.

*Example 2*

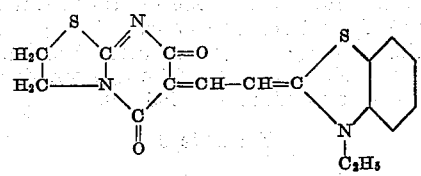

1.7 grams of 2,3-dihydro-5H-thiazolo[3,2-a]-pyrimidine-5,7(6)-dione, made from 2-amino thiazoline and ethyl malonate, and 3.3 grams of 2(β-acetanilido vinyl) benzthiazole ethiodide were suspended in 30.0 cc. of isopropyl alcohol and 0.5 cc. of triethylamine added. The mixture was refluxed for 1 hour. The dye which precipitated, was filtered after cooling and washed with water. The dye was purified by crystallizing from methyl alcohol. The dye sensitized to 570 mu with a maximum at 530 mu.

*Example 3*

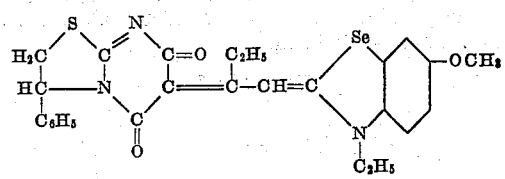

2.3 grams of 2,3-dihydro-3-phenyl-5H-thiazolo[3,2-a]pyrimidine-5,7(6)-dione made from 2-amino-4-phenyl thiazoline and ethyl malonate, and 3.1 grams of 2(β-methylmercapto β-ethyl vinyl)-6-methoxy benzselenazole ethiodide and 0.5 cc. of triethylamine were refluxed in 30.0 cc. of n-propyl alcohol for 1 hour. The reaction mixture was cooled and the dye which separated was filtered off and recrystallized from methyl alcohol. The dye sensitized to 600 mu and had a sensitizing maximum at 560 mu.

Example 4

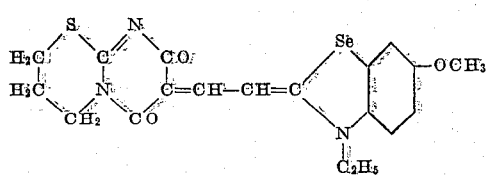

1.8 grams of 2,3-dihydro-6H-pyrimido[2,3-b]-1,3,4-thiazine-6,8(7)-dione prepared from 2-amino-dihydrothiazine and ethyl malonate and 4.7 grams of 2-(β-acetanilido vinyl)-6-methoxy benzselenazole ethiodide, and 0.5 cc. of triethylamine were refluxed in 30.0 cc. of n-propyl alcohol for 1 hour. The dye was crystallized from methyl alcohol. The dye sensitized to 600 mu and had a sensitizing maximum at 560 mu.

Example 5

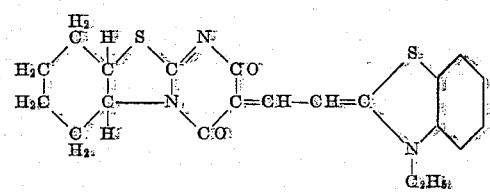

2.2 grams of 6,7,8,9,10,11-hexahydro-4H-pyrimido[2,1-b]benzothiazole-2,4(3)-dione prepared from 2-amino hexahydrothiazole and ethyl malonate were mixed with 3.3 grams of 2-(β-acetanilido vinyl) benzthiazole ethiodide and 0.5 cc. of triethylamine and the mixture refluxed in isopropyl alcohol for one hour. The dye, which separated out on cooling, was filtered off and recrystallized from alcohol. The dye sensitized to 575 mu with a maximum at 545 mu.

Example 6

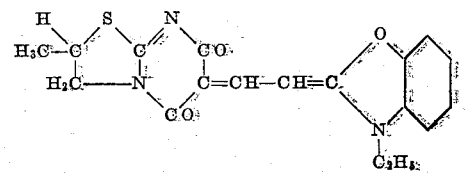

1.8 grams of 2,3-dihydro-2-methyl-5H-thiazolo[3,2-a]pyrimidine-5,7(6)-dione prepared from 2-amino-5-methyl thiazoline and ethyl malonate was mixed with an equimolecular amount of 2-(β-acetanilido vinyl) benzoxazole ethiodide and 0.5 cc. triethylamine and refluxed in isopropyl alcohol. The dye was recrystallized from ethyl alcohol. It sensitized to 560 mu with a maximum at 525 mu.

Example 7

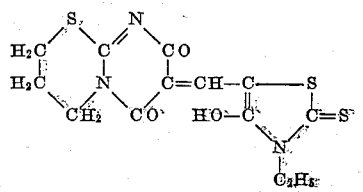

1.8 grams of 2,3-dihydro-6H-pyrimido[2,3-b]1,3,4-thiazine-6,8(7)-dione, prepared from 2-amino dihydrothiazine and ethyl malonate; and 2.7 grams of 2-thio-3-ethyl-5-acetanilidomethylene dihydrothiazolidone-4 were mixed with 0.5 cc. of triethylamine in 30.0 cc. of pyridine and refluxed for 1 hour. The cooled reaction mixture was diluted with water and carefully precipitated with perchloric acid. The dye was filtered off, dissolved in 3 N caustic and again carefully precipitated with perchloric acid. The dye sensitized to 530 mu with a maximum at 525 mu.

Example 8

1.7 grams of 2,3-dihydro-5H-thiazolo[3,2-a]pyrimidine-5,7(6)-dione and an equimolecular amount of ethiodide of 2-phenylthiobenzthiazole were refluxed in 30 cc. of isopropyl alcohol and 0.5 cc. of triethylamine for about 1 hour. A dye having the following formula was obtained:

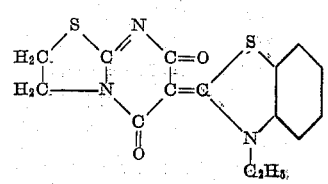

Example 9

1.7 grams of 2,3-dihydro-5H-thiazolo[3,2-a]pyrimidine-5,7(6)-dione and an equimolecular amount of 2-(4-acetanilidobutadienyl) benzothiazole ethiodide were refluxed in the presence of 0.5 cc. of triethylamine and 30 cc. of ethyl alcohol. A dye having the following formula was obtained:

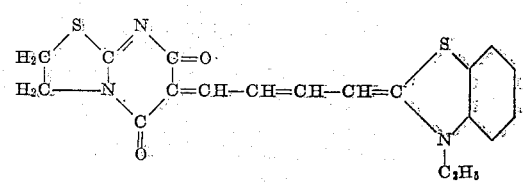

Example 10

One-tenth mole of a compound which is produced by reacting equimolecular amounts of 2,3-dihydro-5H-thiazolo[3,2-a]pyrimidine-5,7(6)-dione and diphenyl formamidine in the presence of acetic anhydride and having the formula:

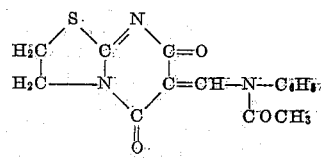

is reacted with 2-methyl benzthiazole ethiodide in the presence of 30 cc. of isopropyl alcohol and 0.5 cc. of triethylamine by refluxing the mixture for about 1 hour. The dye which precipitated was filtered after cooling, washed with water, and crystallized from methyl alcohol. It was the same as the dye produced by the procedure of Example 2.

The new dyes of this invention may be incorporated in any gelatino-silver halide, such as gelatino-silver-chloride or gelatino-silver-bromide emulsions to optically sensitize such emulsions. The figures given in the above examples for the sensitizing action of the dyes are based on a silver chloride gelatin emulsion containing a small amount of silver bromide and having a total content of 4–5% of silver halide, in which there has been incorporated in 1 kilogram of the emulsion an ethyl alcohol solution of 20 milligrams of the dye.

The dyes may also be utilized to produce light filters and in the dyeing of textile materials.

I claim:
1. A cyanine dye of the class consisting of dyes having the following formulae:

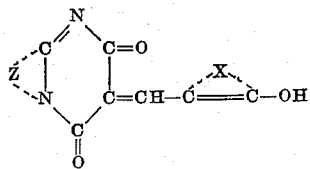

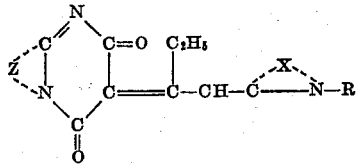

and

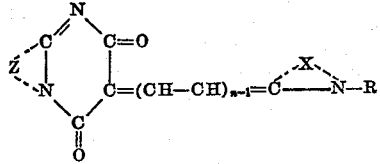

wherein X and Z represent the atoms necessary to complete a nitrogenous heterocyclic nucleus usual in the cyanine dye art, $n$ represents a positive integer ranging from 1 to 3, and R represents an alkyl radical.

2. A cyanine dye having the following formula:

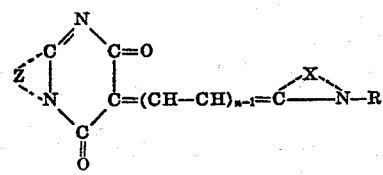

wherein Z represents the non-metallic atoms necessary to complete a thiazole nucleus, X represents the atoms necessary to complete a nitrogenous heterocyclic nucleus usual in the cyanine dye art, $n$ represents a positive integer ranging from 1 to 3, and R represents an alkyl radical.

3. A cyanine dye having the following formula:

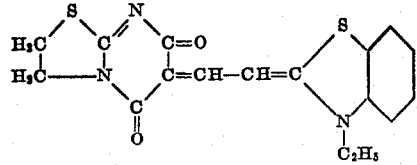

4. A cyanine dye having the following formula:

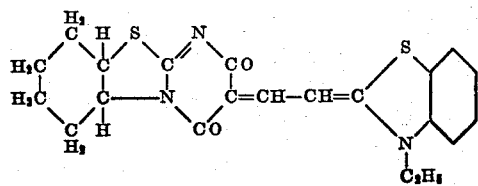

5. A process for preparing a cyanine dye which comprises reacting in the presence of a condensing agent a heterocyclic quaternary ammonium salt of the type usual in cyanine dyes having a reactive group selected from the class consisting of anilidovinyl, acetanilidovinyl, acetanilidomethylene, acetanilidobutadienyl, methyl mercapto vinyl, methyl mercapto ethyl vinyl, and phenyl mercapto groups with a polycyclic diketo pyridimine compound having the following structural formula:

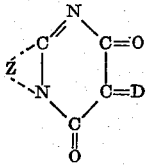

wherein Z represents the non-metallic atoms necessary to complete a heterocyclic nucleus usual in the cyanine dye art, and D stands for a member selected from the group consisting of $H_2$ and

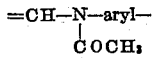

6. A method of forming a cyanine dye having the following formula:

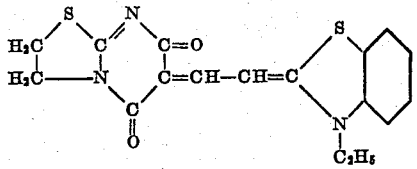

which comprises condensing in the presence of a basic condensing agent, 2,3-dihydro-5H-thiazolo-[3,2-a]pyrimidine-5-7(6)-dione with 2-(β-acetanilido vinyl) benzthiazole ethiodide.

7. A method of forming a cyanine dye having the following formula:

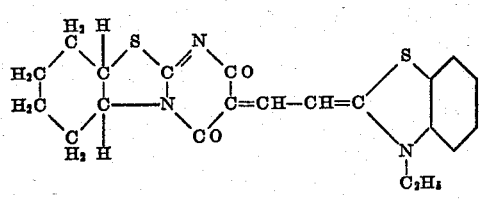

which comprises condensing in the presence of a basic condensing agent 6,7,8,9,10,11-hexahydro-4-H - pyrimido[2,1 - b]benzothiazole - 2,4 - (3) - dione with 2-(β-acetanilido vinyl) benzthiazole ethiodide.

ALFRED W. ANISH.

No references cited.